(12) United States Patent
Yamamoto (10) Patent No.: US 11,077,510 B2
(45) Date of Patent: Aug. 3, 2021

(54) FINE HOLE ELECTRIC DISCHARGE MACHINE

(71) Applicant: SODICK CO., LTD., Kanagawa (JP)

(72) Inventor: Yoshinobu Yamamoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 310 days.

(21) Appl. No.: 16/351,439

(22) Filed: Mar. 12, 2019

(65) Prior Publication Data

US 2019/0291198 A1   Sep. 26, 2019

(30) Foreign Application Priority Data

Mar. 26, 2018   (JP) .............................. JP2018-057516

(51) Int. Cl.
| | | |
|---|---|---|
| *B23H 9/14* | (2006.01) | |
| *B23H 1/10* | (2006.01) | |
| *B23H 7/36* | (2006.01) | |
| *B23H 11/00* | (2006.01) | |
| *B23H 7/26* | (2006.01) | |

(52) U.S. Cl.
CPC ................ *B23H 9/14* (2013.01); *B23H 1/10* (2013.01); *B23H 7/36* (2013.01); *B23H 11/00* (2013.01); *B23H 7/265* (2013.01)

(58) Field of Classification Search
CPC . B23H 9/04; B23H 11/00; B23H 7/36; B23H 1/10; B23H 7/265
See application file for complete search history.

(56) References Cited

U.S. PATENT DOCUMENTS

| | | | |
|---|---|---|---|
| 5,281,788 A | 1/1994 | Abiko et al. | |
| 9,789,555 B2 | 10/2017 | Hamada | |
| 2002/0148814 A1* | 10/2002 | Ishiwata | ................ B23H 7/265 |
| | | | 219/69.2 |
| 2015/0239056 A1* | 8/2015 | Hamada | .................. B23H 9/10 |
| | | | 700/162 |

FOREIGN PATENT DOCUMENTS

| | | |
|---|---|---|
| JP | S58114824 | 7/1983 |
| JP | S6347025 | 2/1988 |

(Continued)

OTHER PUBLICATIONS

Machine translation of JP63134126A, Mar. 2021.*

(Continued)

*Primary Examiner* — Geoffrey S Evans
(74) *Attorney, Agent, or Firm* — JCIPRNET (57) ABSTRACT

A fine hole electric discharge machine includes a machining tank, a storage tank, at least one pipeline, a guide base, a liquid current generator, and a controller. The at least one pipeline has at least one opening directed to the upper surface of a workpiece and allows machining liquid to flow through. The liquid current generator selectively forms a first liquid current in which the machining liquid is supplied from the storage tank and jetted from a predetermined opening of the opening, or a second liquid current in which the machining liquid is sucked from an opening the same as or different from the predetermined opening and recovered to the storage tank. The controller controls the liquid current generator to form the first liquid current or the second liquid current.

13 Claims, 7 Drawing Sheets

(56) References Cited

FOREIGN PATENT DOCUMENTS

| JP | S6384824 | | 4/1988 |
|----|----------|---|---------|
| JP | 63134126 A | * | 6/1988 |
| JP | 04300123 A | * | 10/1992 |
| JP | H04300123 | | 10/1992 |
| JP | 2565680 | | 12/1996 |
| WO | 2014038074 | | 3/2014 |

OTHER PUBLICATIONS

Machine translation of JP04300123A, Mar. 2021.*
"Office Action of Japan Counterpart Application", dated Aug. 20, 2019, with English translation thereof, pp. 1-6.

* cited by examiner

FINE HOLE ELECTRIC DISCHARGE MACHINE

CROSS REFERENCE TO RELATED APPLICATION

The disclosure claims priority under 35 U.S.C. § 119 to Japanese Application No. 2018-057516 filed on Mar. 26, 2018. The entire content of which is incorporated herein by reference.

BACKGROUND

Technical Field

The disclosure relates to an electric discharge machine that generates an electric discharge in a machining gap formed between a tool electrode and a workpiece to remove a material from the workpiece. In particular, the disclosure relates to a fine hole electric discharge machine that machines a hole in the workpiece.

Description of Related Art

In general, a pipe electrode or rod-shaped electrode is used as the tool electrode to machine a hole. The hole formed by the fine hole electric discharge machine is called a machined hole. A machined hole is also called a fine hole or a small hole. The typical pipe electrode is made of copper and has an outer diameter of 0.15 mm to 6.0 mm, for example. The workpiece is fixed onto a stand provided in a machining tank. The fine hole electric discharge machine is equipped with a device that supplies a dielectric liquid, serving as the machining liquid, to the machining gap. The machining liquid is, for example, water having high specific resistance or oil based on kerosene. The machining liquid is usually fed into the machining gap via a channel in the pipe electrode.

Chips that contain fine metal powder are generated in the machining gap by electric discharge machining. When the chips remain in the machining gap, short circuit and abnormal discharge are likely to occur, which causes reduction of the machining speed and deterioration of precision. It also leads to low visibility in the machining tank. Above all, in fine hole electric discharge machining, a machining depth is relatively larger compared to a diameter of the machined hole, and chips are less likely to be discharged as the machining progresses. Even if the chips in the machining gap can be discharged, the chips often remain around the machined hole. A configuration has been proposed for removing the chips around the machining gap by jetting or sucking the machining liquid during machining.

Japanese Laid-Open No. S63-047025 discloses a fine hole electric discharge machine equipped with a machining liquid injector for supplying machining liquid to an upper surface of a workpiece near a machined hole. U.S. Pat. No. 5,281,788 discloses a fine hole electric discharge machining apparatus which jets machining liquid to a periphery of an entrance of a machined hole. Japanese Patent No. 2565680 discloses an attachment disposed near an upper surface of a workpiece. A pipeline is formed in the attachment to suck and recover machining liquid supplied to a machining gap via a passage in a pipe electrode.

In addition, when detecting the upper surface of the workpiece by contact, in order to improve a detection accuracy, it is desirable to remove the chips attached to the upper surface of the workpiece. By jetting the machining liquid to the upper surface of the workpiece, the chips attached to the upper surface can be removed.

SUMMARY

Problems to be Solved

In the conventional fine hole electric discharge machine, a machining liquid environment is not considered to eliminate the chips, even though an effective method to eliminate the chips is different depending on the machining liquid environment. The machining liquid environment is referred to a state whether the machining gap is submerged in the machining liquid. Specifically, the conventional fine hole electric discharge machine cannot select a jetting operation which jets machining liquid or a suction operation which sucks machining liquid according to the machining liquid environment. If the operator is an experienced one, the operator may be able to see the machining liquid environment and make a proper judgment to selectively perform one of the jetting operation and the suction operation manually. Even so, it is necessary for the operator to properly operate the fine hole electric discharge machine, and it places an extra burden on the operator. When a continuous machining of multiple holes is performed, the burden is higher. Specifically, for example, when the workpiece is submerged in the machining liquid, the chips generated in the machining gap are difficult to be discharged outside the machining gap by the machining liquid that covers the workpiece, since the machining depth is relatively larger compared to the diameter of the machined hole in the fine hole electric discharge machine. Therefore, sucking the machining liquid with the chips can more effectively eliminate the chips. On the other hand, when the workpiece is not submerged in the machining liquid, jetting the machining liquid to the periphery of the machining gap and the machined hole to drive the chips away from the periphery of the machined hole is more effective in eliminating the chips that easily remain and accumulate on the periphery of the machined hole. However, when the chips are removed by sucking the machining liquid, an opening for sucking the machining liquid needs to be close enough to the machining gap. If the opening for sucking the machining liquid cannot be brought close to the machining gap, it is better to remove the chips by jetting the machining liquid. That is, the suction environment, i.e., whether the opening for sucking the machining liquid can be brought close to the machining gap, also affects elimination of the chips. Besides, in the fine hole electric discharge machine, the effective method to eliminate the chips is respectively different when a machining operation is performed or when a contact detection operation is performed. For example, in the contact detection operation that is performed when the workpiece is not submerged in the machining liquid, jetting the machining liquid to the periphery of the machined hole can more quickly and effectively eliminate the chips around the machined hole. The chips around the machined hole may hinder the contact detection operation. In order to remove the chips more properly, it is desirable to switch between the jetting operation and the suction operation of the machining liquid according to the machining liquid environment or the suction environment. Further, if it is possible to selectively switch between the jetting operation and the suction operation of the machining liquid, for example, according to an operation purpose in addition to the machining liquid environment, it can be expected that the work burden will be reduced in the same manner. Specifically, the operation purpose refers to whether the operation of the fine hole electric discharge machine is the machining operation or the contact detection operation, for example.

In view of the above, the disclosure mainly provides a fine hole electric discharge machine that can automatically perform the suction operation or the jetting operation of the machining liquid to remove the chips according to a situation, for example, the machining liquid environment, the suction environment, or the operation purpose in accordance with a situation.

Means for Solving the Problems

According to the disclosure, a fine hole electric discharge machine is provided for generating an electric discharge in a machining gap formed between a tool electrode and a workpiece to machine a hole in the workpiece. The fine hole electric discharge machine includes: a machining tank accommodating the workpiece; a storage tank storing machining liquid; at least one pipeline which has at least one opening directed to an upper surface of the workpiece and through which the machining liquid flows; a guide base including a lower guide which positions and guides the tool electrode; a liquid current generator selectively forming a first liquid current or a second liquid current, wherein the first liquid current is the machining liquid which is supplied from the storage tank and jetted from a predetermined opening of the at least one opening, and the second liquid current is the machining liquid which is sucked from an opening the same as or different from the predetermined opening of the at least one opening and recovered to the storage tank; and a controller controlling the liquid current generator to form the first liquid current or the second liquid current.

Effects

In the fine hole electric discharge machine according to the disclosure, the jetting operation or the suction operation of the machining liquid is selected automatically according to the situation. The situation is, for example, the machining liquid environment, the suction environment, or the operation purpose. Specifically, the operation is selected according to whether the machining gap is submerged in the machining liquid during machining, whether the opening for sucking the machining liquid is close to the machining gap during machining, or whether it is in a state of before the contact detection. Thus, high-speed and high-precision machining and highly accurate contact detection can be achieved.

DESCRIPTION OF THE EMBODIMENTS

An embodiment of the disclosure will be described below with reference to FIG. 1 to FIG. 6. Modifications of a plurality of constituent members described below can be combined in any way to be embodied.

Figure 1:
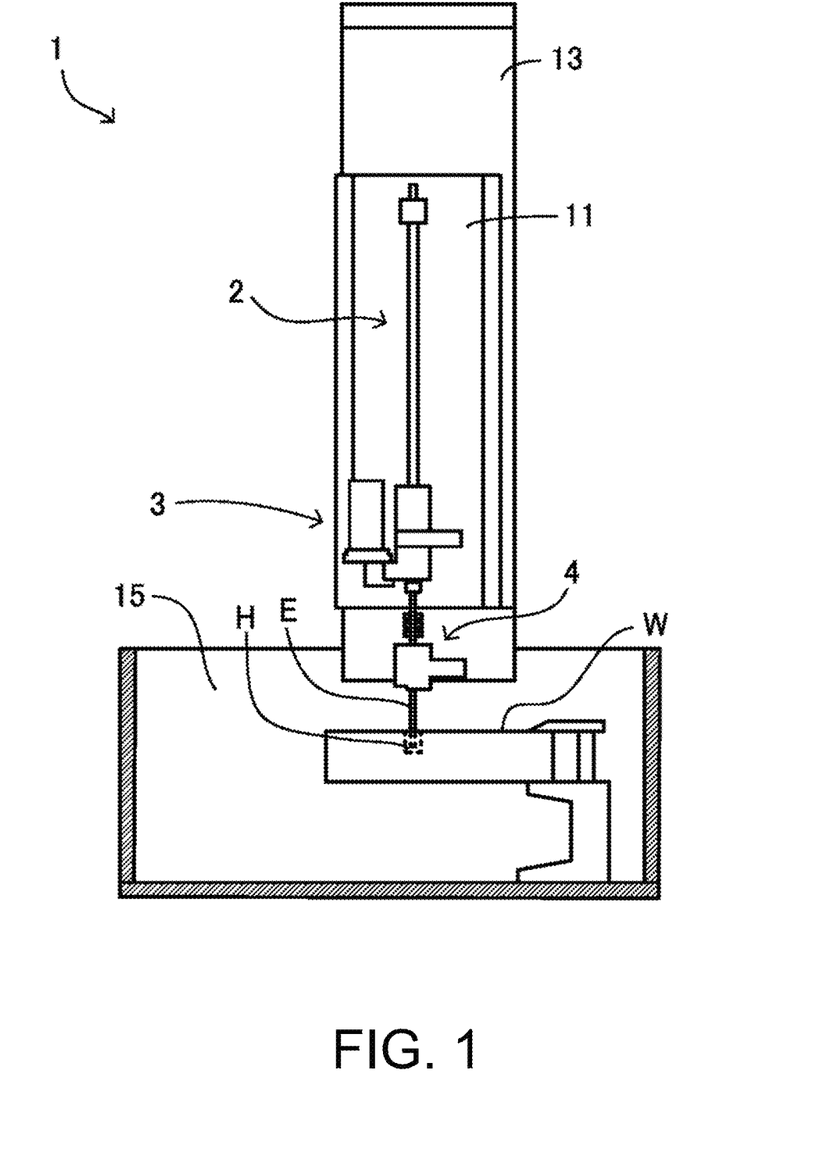
FIG. 1 is a view showing a schematic configuration of a fine hole electric discharge machine of a present embodiment.
Figure 5:
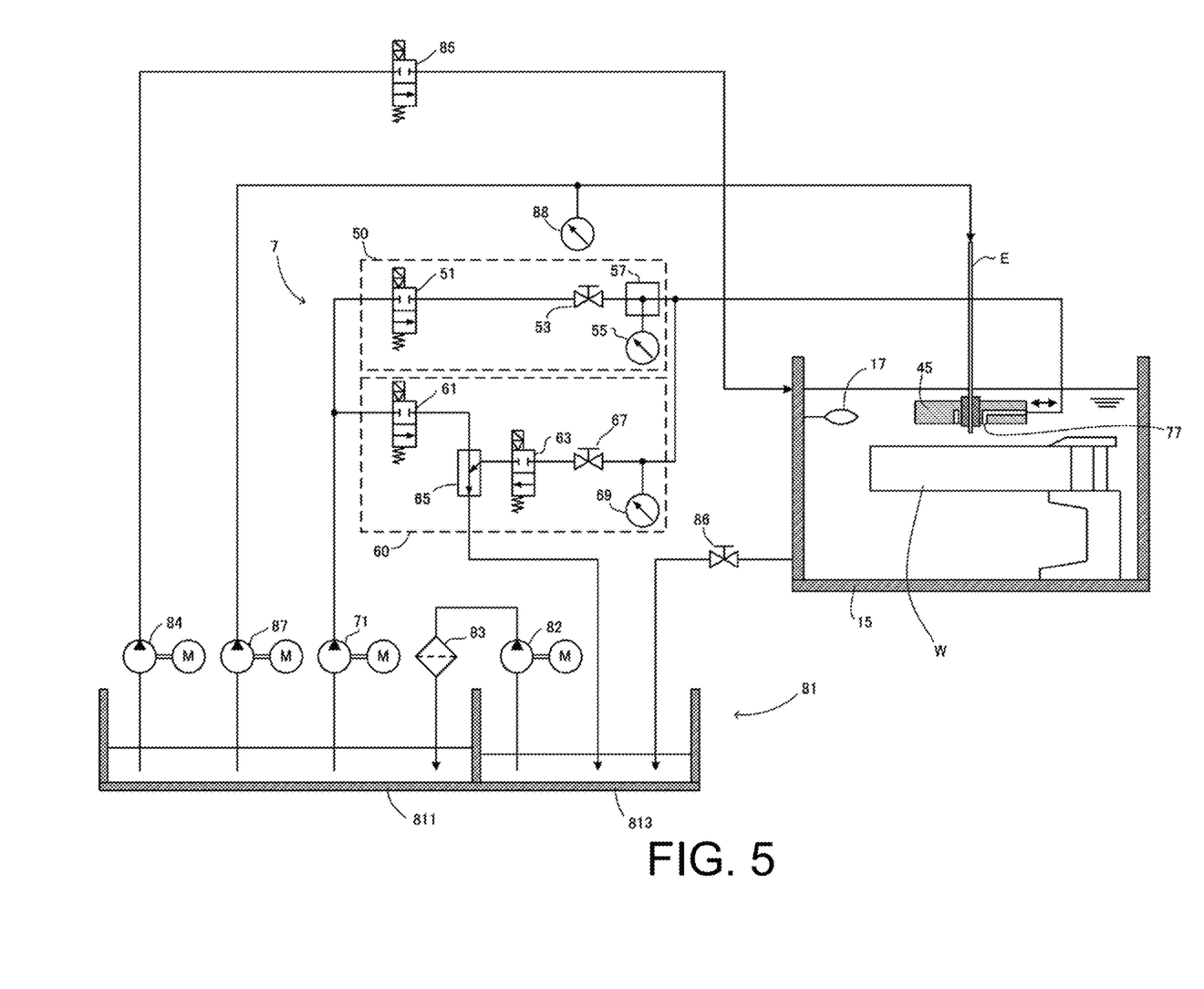
FIG. 5 is a circuit diagram showing a supply/discharge path of machining liquid.

As shown in FIG. 1, a fine hole electric discharge machine 1 of the present embodiment includes a Z axis unit 11, a W axis unit 13, and a machining tank 15. The W axis unit 13 is configured to be movable and positioned in a vertical uniaxial direction (W axial direction) by a W axis drive device (not shown). The Z axis unit 11 is configured to be positionable in a vertical uniaxial direction (Z axial direction), which is parallel to the W axial direction, by a Z axis drive device (not shown) via a slider provided in the W axis unit 13. The Z axis unit 11 is provided with a supply unit 2 for supplying a tool electrode E, and a main shaft unit 3 for rotatably holding the tool electrode E. In addition, a guide unit 4 for guiding the tool electrode E is provided at the lower portion of the W axis unit 13. The Z axis unit 11 and the W axis unit 13 are configured to be positionable in a horizontal uniaxial direction (X axial direction) and a horizontal uniaxial direction (Y axial direction) perpendicular to the X axial direction by an X axis drive device and a Y axis drive device (not shown). A workpiece W to be machined is accommodated in the machining tank 15, which is formed by a table stacked on a bed (not shown) and tank walls surrounding the table, and machining liquid is supplied as required. As shown in FIG. 5, the machining tank 15 is provided with a liquid level sensor 17 for detecting a liquid level of the machining liquid supplied to the machining tank 15. The liquid level sensor 17 is, for example, a floating level meter which outputs a signal when the liquid level of the machining liquid is at a predetermined height that is sufficient to submerge the workpiece W. In a machining operation, a predetermined machining voltage is applied to a machining gap formed between the tool electrode E and the workpiece W from a power supply 95 shown in FIG. 6. Moreover, the machining operation is an operation to perform electric discharge machining to the workpiece W into a desired shape with the tool electrode E. A machined hole H is formed at the workpiece W by the machining operation. Below, a state where the machining operation is in progress refers to "during machining".

The supply unit 2 includes an electrode case (not shown) and a case pusher 21. A plurality of tool electrodes E are accommodated in the electrode case, and the case pusher 21 supplies the tool electrodes E one by one to the main shaft unit 3.

Figure 2:
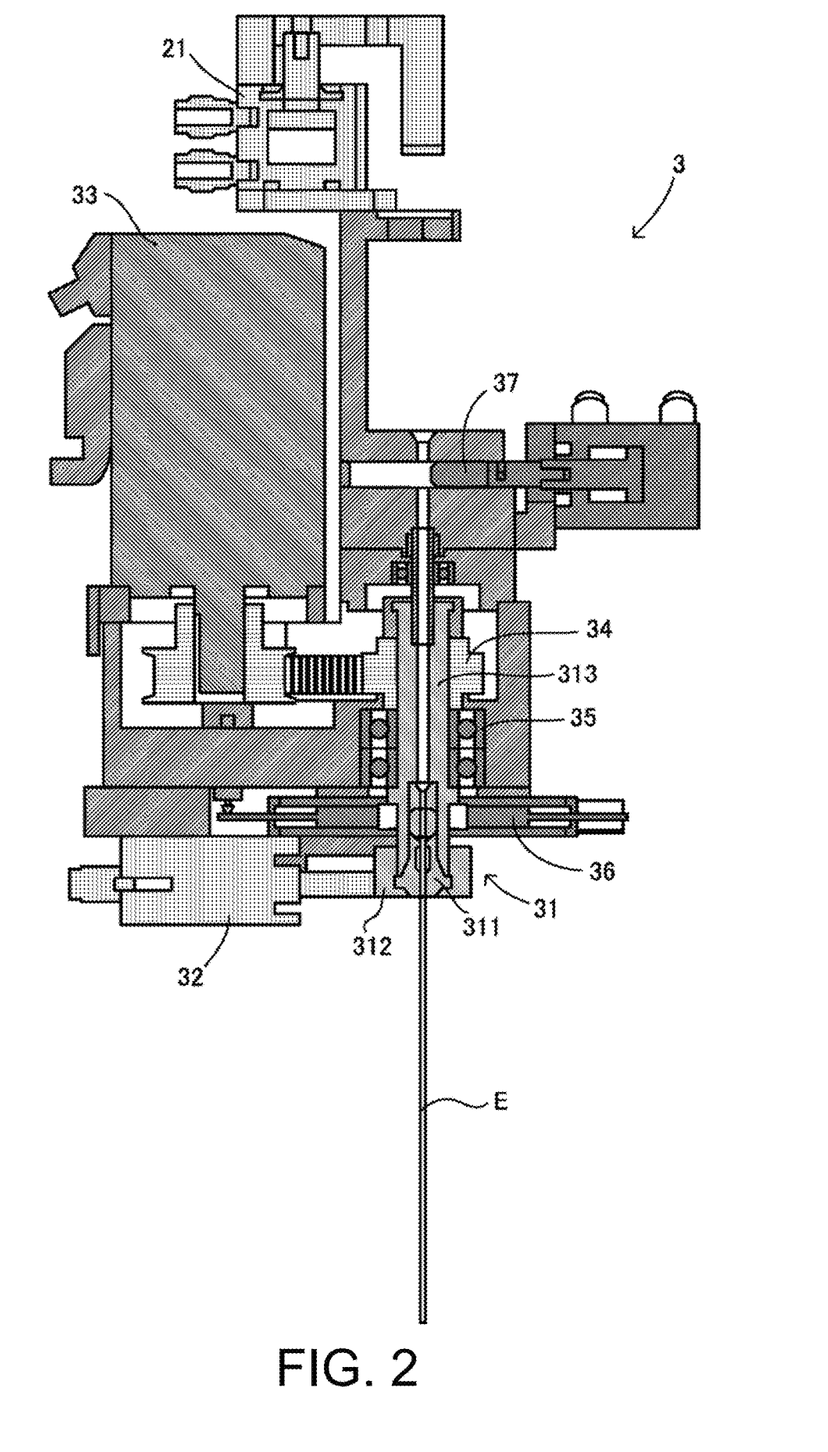
FIG. 2 is an enlarged view showing a configuration of a main shaft unit.

As shown in FIG. 2, the main shaft unit 3 includes a collet unit 31, a collet finger 32, a spindle motor 33, a transmission mechanism 34, a bearing 35, a brush 36, and a seal pusher 37. The tool electrode E sent from the supply unit 2 is sent to the collet unit 31, and the tool electrode E is gripped by a collet 311 of the collet unit 31. The collet finger 32 is an opening/closing actuator that grips and fixes a lock nut 312 of the collet unit 31. A collet holder 313 of the collet unit 31 is rotatably held by the bearing 35 and is configured to be rotatable by the spindle motor 33 via the transmission mechanism 34 such as a pulley and a belt. In the machining operation, a current is supplied from the power supply 95 to the tool electrode E via the brush 36. When the tool electrode E is a pipe electrode, it is desirable to make the machining liquid supplied from a machining liquid supply port (not shown) flow through a channel inside the tool electrode E and jet the machining liquid from the tip of the tool electrode E during machining. When the machining liquid is supplied to the inside of the tool electrode E, the seal pusher 37 is closed and the machining liquid is prevented from flowing back to the side of the supply unit 2.

Figure 3:
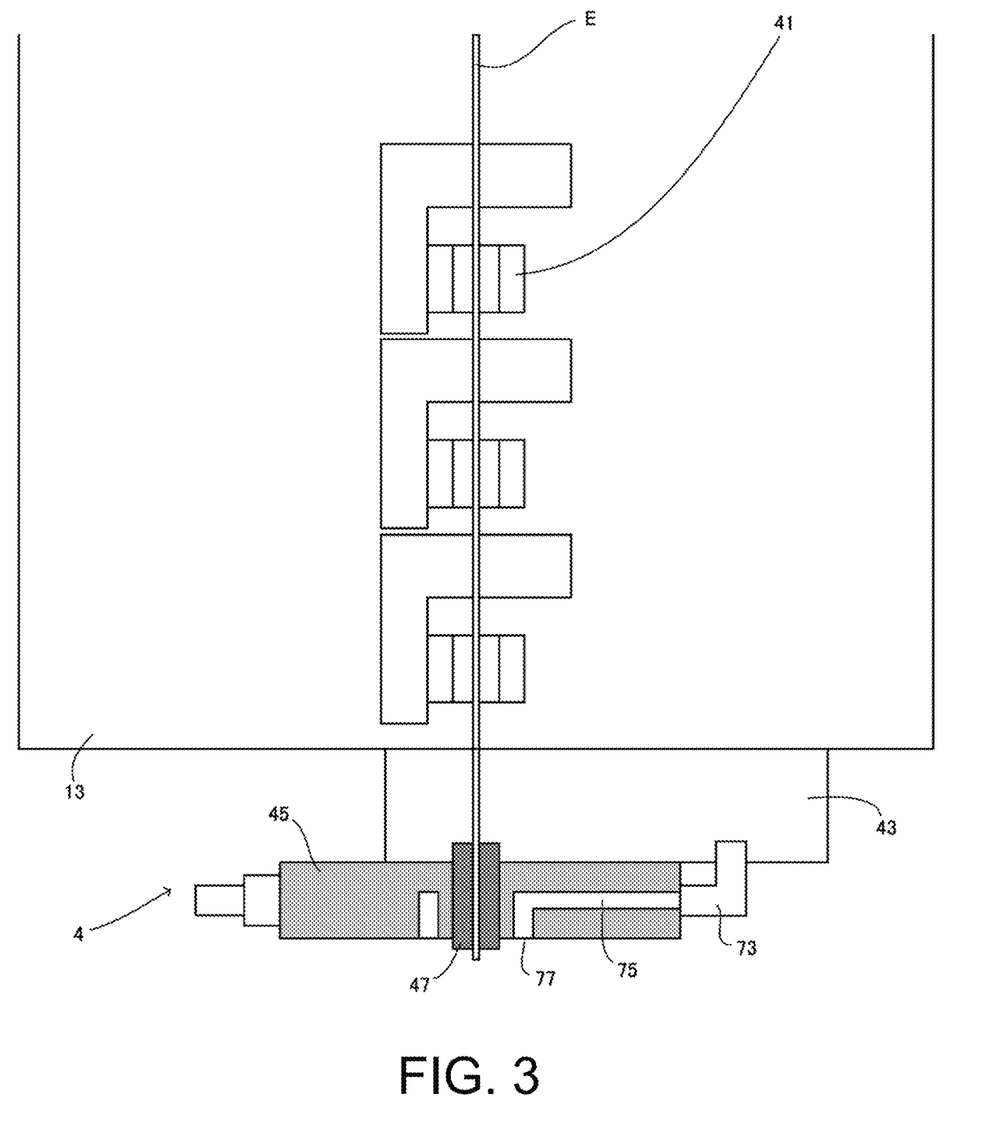
FIG. 3 is an enlarged view showing a configuration of a guide unit.

As shown in FIG. 3, the guide unit 4 includes an intermediate guide 41, a bracket 43, and a guide base 45 having a lower guide 47. The intermediate guide 41 supports and guides the tool electrode E between the main shaft unit 3 and the guide base 45 so as to prevent deflection of the tool electrode E. The intermediate guide 41 protrudes in the direction of the tool electrode E according to the distance between the main shaft unit 3 and the guide base 45 when used. The intermediate guide 41 is accommodated on the back side of the paper surface of FIG. 3 when not required. The guide base 45 is fixed to the W axis unit 13 via the bracket 43. The tool electrode E is inserted through the lower guide 47 of the guide base 45, and the tool electrode E is positioned and guided.

The fine hole electric discharge machine 1 includes a pipeline 75 that has an opening 77 directed to an upper surface of the workpiece W. In the present embodiment, the opening 77 is formed on a lower surface of the guide base 45 and the pipeline 75 is formed inside the guide base 45. The pipeline 75 is configured for the machining liquid to flow through. As will be described later, the machining liquid supplied via a joint 73 is jetted from the opening 77 through the pipeline 75. Moreover, the machining liquid sucked from the opening 77 is discharged via the joint 73 through the pipeline 75. Since the guide base 45 is positioned as close to the workpiece W as possible during machining, by disposing the opening 77 on the lower surface of the guide base 45, it is possible to jet and suck the machining liquid at a closer position during machining.

Figure 4A:
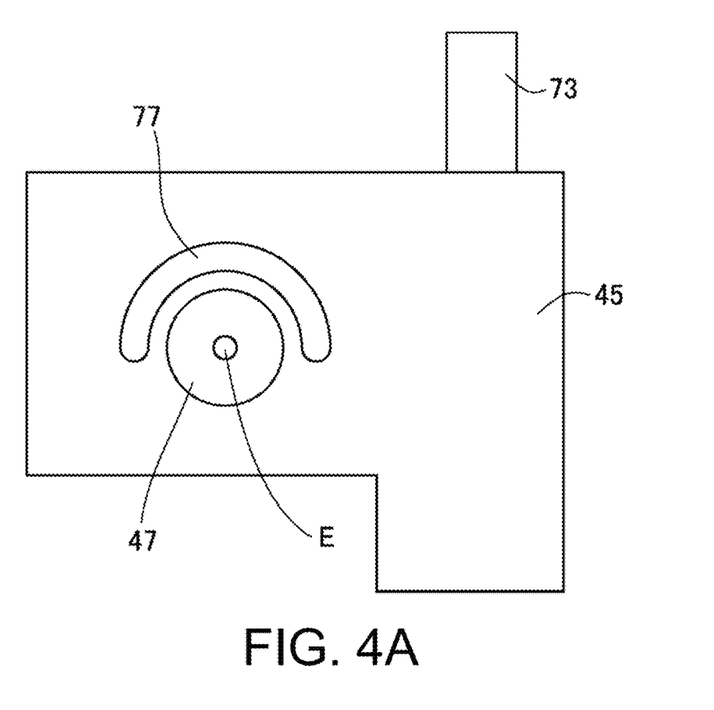
FIG. 4A is a bottom view of a guide base and shows an example of an opening.
Figure 4B:
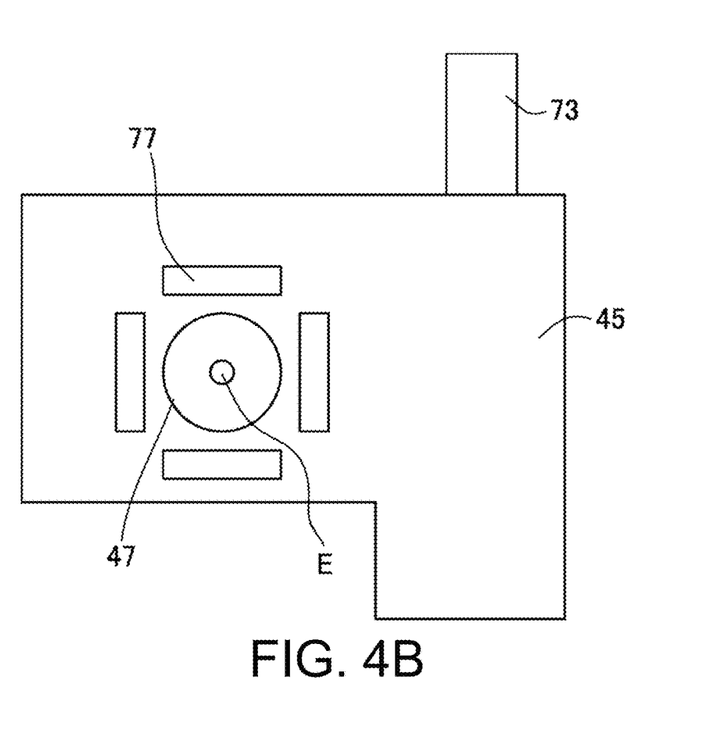
FIG. 4B is a bottom view of the guide base and shows an example of an opening different from the opening of FIG. 4A.
Figure 4C:
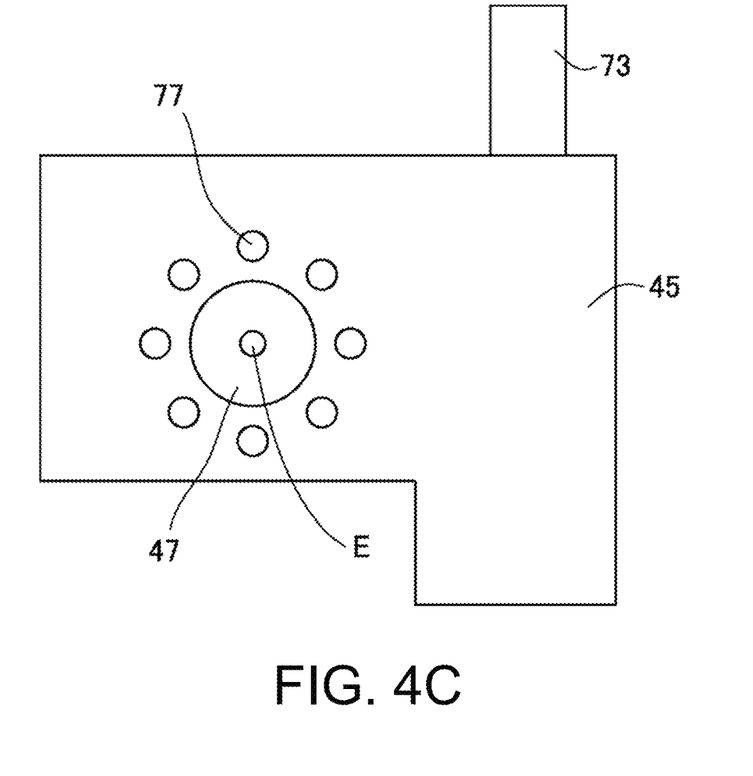
FIG. 4C is a bottom view of the guide base and shows an example of an opening different from the openings of FIG. 4A and FIG. 4B.

Preferably, the opening 77 is disposed near the tool electrode E to surround the tool electrode E. For surrounding the tool electrode E, the opening 77 may be formed in various shapes such as an arc shape, a rectangular shape, and a circular shape, and one or more openings 77 may be formed, as shown in FIG. 4A, FIG. 4B, and FIG. 4C. With such an opening 77, a first liquid current which is the current of the jetted machining liquid and a second liquid current which is the current of the sucked machining liquid can be formed substantially coaxially with the tool electrode E, and therefore the chips around the machined hole H can be removed more efficiently.

One or more pipelines 75 may be provided, and one pipeline may have one opening 77 or a plurality of openings 77. Also, the same pipeline 75 and opening 77 may be used in forming the first liquid current and the second liquid current as in the present embodiment. Separate pipelines 75 may be used or separate openings 77 may be used in forming the first liquid current or the second liquid current.

Here, a supply/discharge path of the machining liquid will be described with reference to FIG. 5. A storage tank 81 that stores the machining liquid is partitioned into a clean liquid tank 811 and a dirty liquid tank 813. The dirty liquid tank 813 recovers and stores dirty used machining liquid that includes the chips. A pump 82 sends the machining liquid from the dirty liquid tank 813 to the clean liquid tank 811 at a predetermined flow rate through a filter 83 which removes the chips to purify the machining liquid. When submerged machining is performed, the machining liquid drawn up by a pump 84 is sent to the machining tank 15 via a solenoid valve 85. Submerged machining is electric discharge machining in the state where the machining gap is submerged in the machining liquid. A drain valve 86 is closed until the machining liquid is supplied to the machining tank 15 up to a predetermined liquid level, and is opened when the machining liquid is discharged from the machining tank 15. The machining liquid is circulated between the machining tank 15 and the storage tank 81 while keeping the liquid level of the machining tank 15 constant by adjusting an opening degree of the drain valve 86 during submerged machining.

As described above, when the tool electrode E is the pipe electrode, it is desirable to send the machining liquid from a pump 87 to the tool electrode E at the predetermined flow rate during machining. A pressure gauge 88 is disposed between the pump 87 and the tool electrode E so as to confirm whether the machining liquid is properly jetted from the tool electrode E. With such a configuration, the chips that accumulate at the bottom of the machined hole H can be discharged outside the machined hole H.

The fine hole electric discharge machine 1 of the present embodiment includes a liquid current generator 7 for jetting or sucking the machining liquid from the opening 77. The operation of the liquid current generator 7 is selectively switched according to a machining liquid environment, a suction environment, or an operation purpose. In other words, the liquid current generator 7 can selectively form the first liquid current, in which the machining liquid is jetted from the opening 77, and the second liquid current, in which the machining liquid is sucked from the opening 77. The liquid current generator 7 includes a pump 71 which supplies the machining liquid from the clean liquid tank 811 of the storage tank 81 to the pipeline 75 when forming the first liquid current or the second liquid current. Moreover, as shown in FIG. 5, the liquid current generator 7 includes a first channel 50 and a second channel 60 that are disposed in parallel between the pump 71 and the pipeline 75.

The first channel 50 has a first solenoid valve 51, a jetting adjustment valve 53, a jetting pressure gauge 55, and a jetting pressure sensor 57. The first solenoid valve 51 is opened when forming the first liquid current, and is closed when forming the second liquid current. The jetting adjustment valve 53 adjusts a jetting pressure of the first liquid current to an appropriate pressure. The jetting pressure gauge 55 measures the jetting pressure of the first liquid current and displays a measured value to an operator. The jetting pressure sensor 57 measures the jetting pressure of the first liquid current and outputs the measured value as a signal to a controller 9. The jetting pressure sensor 57 may also serve as the jetting pressure gauge 55.

The second channel 60 has an aspirator 65, a second solenoid valve 61, a third solenoid valve 63, a suction adjustment valve 67, and a suction pressure gauge 69. The aspirator 65 has a supply port, a suction port, and a discharge port. The discharge port of the aspirator 65 is connected to the dirty liquid tank 813 of the storage tank 81. The second solenoid valve 61 is disposed between the pump 71 and the supply port of the aspirator 65, and is closed when forming the first liquid current and is opened when forming the second liquid current. The third solenoid valve 63 is disposed between the suction port of the aspirator 65 and the pipeline 75, and is closed when forming the first liquid current and is opened when forming the second liquid current. The suction adjustment valve 67 adjusts a suction pressure of the second liquid current to an appropriate pressure. The suction pressure gauge 69 measures the suction pressure of the second liquid current and displays the measured value to the operator.

When forming the first liquid current, the controller 9 opens the first solenoid valve 51, closes the second solenoid valve 61 and the third solenoid valve 63, and pumps the machining liquid with the pump 71. As a result, the machining liquid passes through the joint 73 and the pipeline 75 and is jetted from the opening 77. In this manner, the first liquid current is formed.

When forming the second liquid current, the controller 9 closes the first solenoid valve 51, opens the second solenoid valve 61 and the third solenoid valve 63, and pumps the machining liquid with the pump 71. As a result, the suction port of the aspirator 65 is depressurized by the Venturi effect caused by sending the machining liquid from the supply port to the discharge port of the aspirator 65, and the machining liquid sucked from the opening 77 passes through the pipeline 75 and the joint 73 and is discharged from the discharge port of the aspirator 65 to the dirty liquid tank 813. In this manner, the second liquid current is formed.

Figure 6:
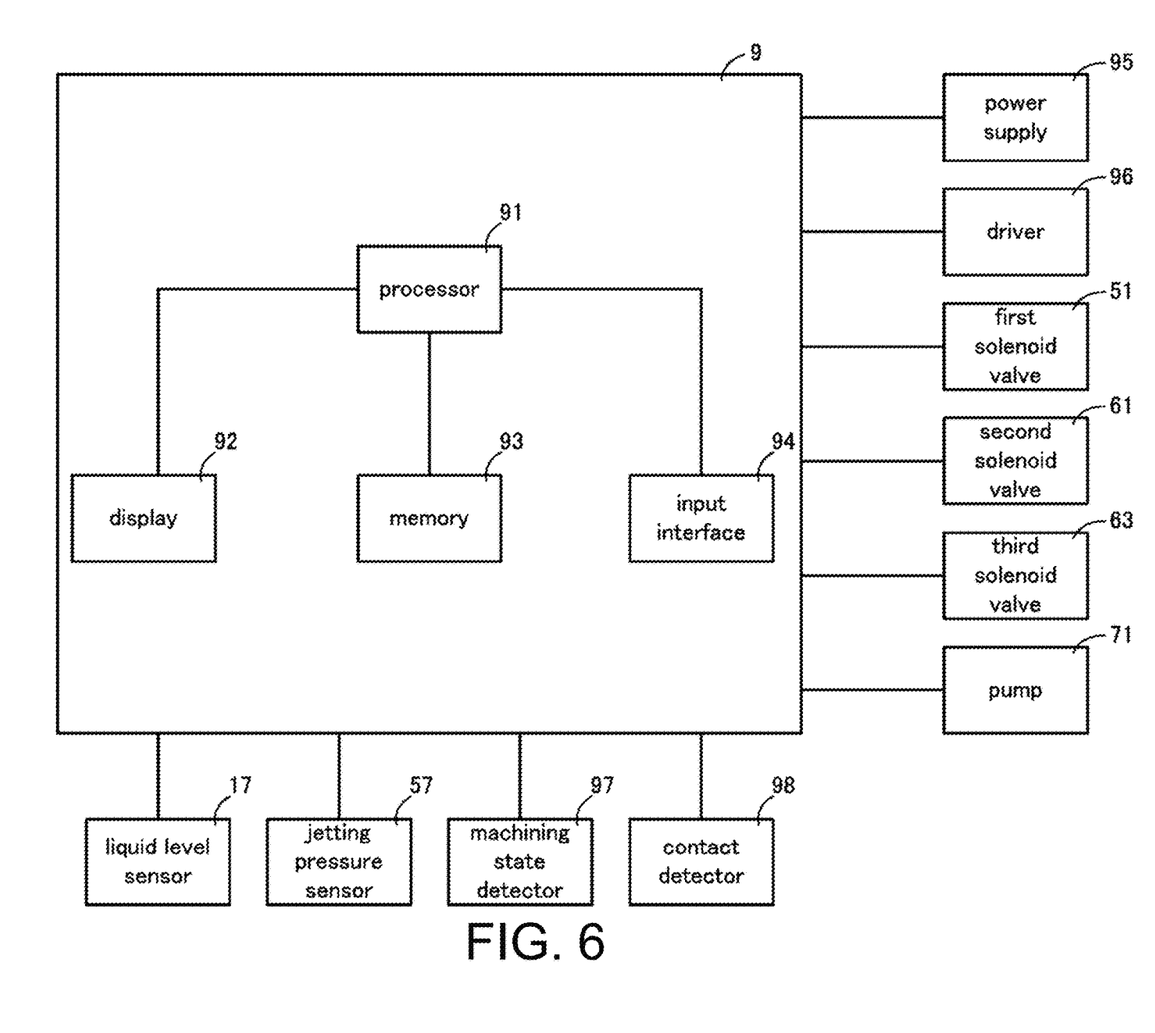
FIG. 6 is a block diagram showing a controller.

Next, the controller 9 of the fine hole electric discharge machine 1 shown in FIG. 6 will be described. The controller 9 includes a processor 91 for performing various calculations, a display 92 for displaying an operation screen and various parameters, a memory 93 for storing data such as a machining program, and an input interface 94 for receiving input from a keyboard or the like and reading an external storage medium, and controls the fine hole electric discharge machine 1. The power supply 95 supplies a controlled power pulse to the machining gap formed between the tool electrode E and the workpiece W in accordance with a command of the controller 9 to repeatedly generate an electric discharge. Due to the electric discharge generated by the power supply 95, the material is removed little by little from the workpiece W. A driver 96 drives various drive devices such as the X axis drive device, the Y axis drive device, the Z axis drive device, the W axis drive device, and the spindle motor 33 according to a command of the controller 9. The controller 9 controls the Z axis drive device so as to lower the tool electrode E little by little according to the removal of the material of the workpiece W during machining.

A machining state detector 97 detects a machining state and outputs a machining state signal to the controller 9. The controller 9 feedback-controls the power supply 95 according to the machining state signal. The machining state refers to various parameters associated with the electric discharge machining and includes at least one of an electric discharge frequency, an electric discharge voltage, and a machining speed, for example.

A contact detector 98 is a device that performs a contact detection operation during non-machining, and grasps relative positions of the tool electrode E and the workpiece W. Specifically, the contact detector 98 applies a measurement voltage between the tool electrode E and the workpiece W. The measurement voltage is, for example, a low voltage of 20V or less. Next, the controller 9 sends a command to the driver 96 and lowers the Z axis unit 11. As a result, when the tool electrode E comes into contact with the upper surface of the workpiece W, the contact detector 98 detects the contact based on a voltage drop between the tool electrode E and the workpiece W. A contact detection signal outputted from the contact detector 98 is inputted to the controller 9, and the controller 9 sends a command to the driver 96 to stop the Z axis unit 11 and stores the position of the Z axis unit 11 at the time of contact in the memory 93.

Further, the controller 9 makes the liquid current generator 7 form the first liquid current or the second liquid current according to the machining liquid environment, the suction environment, or the operation purpose. Specifically, the controller 9 switches the first solenoid valve 51, the second solenoid valve 61, and the third solenoid valve 63 as described above, and then operates the pump 71. Specifically, the machining liquid environment contains a state where the machining gap is submerged in the machining liquid (hereinafter referred to as a submerged state) and a state where the machining gap is not submerged in the machining liquid (hereinafter referred to as a non-submerged state). In addition, specifically, the suction environment contains a state where the opening 77 for sucking the machining liquid is sufficiently close to the machining gap (hereinafter referred to as a proximity state) and a state where the opening 77 for sucking the machining liquid is not sufficiently close to the machining gap (hereinafter referred to as a non-proximity state). Further, specifically, the operation purpose indicates which of the machining operation and the contact detection operation is the purpose of the fine hole electric discharge machine 1. The machining operation is to perform electric discharge machining to the workpiece W into a desired shape with the tool electrode E. The contact detection operation is to slowly lower the tool electrode E and detect the relative positions of the lower end of the tool electrode E and the upper surface of the workpiece W by contact.

When the first liquid current is formed during the machining operation, the clean machining liquid is jetted from the opening 77 and the chips around the machined hole H are blown away. When the second liquid current is formed during the machining operation, the machining liquid is sucked from the opening 77 and the chips around the machined hole H are removed.

When the machining operation is performed in the submerged state, it is desirable that the liquid current generator 7 forms the second liquid current. However, when the machining operation is performed in the non-submerged state, it is desirable that the liquid current generator 7 forms the first liquid current.

The state of the machining liquid environment is judged, for example, by the liquid level sensor 17. Specifically, the liquid level sensor 17 detects whether the liquid level of the machining liquid in the machining tank 15 is at the predetermined height or higher, or lower than the predetermined height. The controller 9 makes the liquid current generator 7 form the first liquid current when the liquid level is lower than the predetermined height, and makes the liquid current generator 7 form the second liquid current when the liquid level is at the predetermined height or higher.

In addition, when the machining operation is performed in the proximity state, it is desirable that the liquid current generator 7 forms the second liquid current. However, when the machining operation is performed in the non-proximity state, it is desirable that the liquid current generator 7 forms the first liquid current.

The state of the suction environment is judged, for example, by the jetting pressure sensor 57. The jetting pressure of the machining liquid is higher when it is in the proximity state, and is lower when it is in the non-proximity state. Therefore, whether it is the proximity state or the non-proximity state can be judged by forming the first liquid current for a predetermined time at the start of the machining operation and measuring the jetting pressure. Then, the controller 9 makes the liquid current generator 7 form the first liquid current when the jetting pressure is less than a predetermined threshold value, and makes the liquid current generator 7 form the second liquid current when the jetting pressure is equal to or greater than the predetermined threshold value.

Usually, the lower guide 47 is positioned close to the workpiece W during the machining operation. Thus, the opening 77 formed on the lower surface of the guide base 45 is also close to the machined hole H of the workpiece W formed by the tool electrode E. However, if the upper surface of the workpiece W is stepped or inclined, the lower guide 47 may not be sufficiently close to the workpiece W. As a result, the opening 77 may not be close to the machined hole H. With this method, the suction environment can be judged accurately regardless of the shape of the workpiece W. When there is a movement in the X axial direction or the Y axial direction in the Z axis unit 11 and the W axis unit 13, the suction environment may change, so it is desirable to confirm the suction environment again.

The above-described methods are implemented in combination as appropriate. After making the liquid current generator 7 form the first liquid current in advance for the predetermined time to measure the jetting pressure, the controller 9 controls the liquid current generator 7 during machining according to the machining liquid environment and the suction environment. When the liquid level is lower than the predetermined height or when the liquid level is at the predetermined height or higher and the jetting pressure is less than the predetermined threshold value, the controller 9 controls the liquid current generator 7 to form the first liquid current. When the liquid level is at the predetermined height or higher and the jetting pressure is equal to or greater than the predetermined threshold value, the controller 9 controls the liquid current generator 7 to form the second liquid current. As a result, the chips around the machined hole H are properly removed according to the machining liquid environment and the suction environment, and high-speed and high-precision machining can be realized.

In addition, when performing the contact detection operation, that is, when the operation purpose is the contact detection operation, the controller 9 controls the liquid current generator 7 to form the first liquid current toward the upper surface of the workpiece W at least before detecting the upper surface of the workpiece W by contact, that is, before or while the tool electrode E is lowered. In this manner, the chips attached to the upper surface of the workpiece W can be removed by jetting the machining liquid, and the contact detection operation can be performed more accurately. The jetting of the machining liquid may be continued even after the contact detector 98 detects that the tool electrode E has come into contact with the workpiece W.

The disclosure is not limited to the configuration of the embodiment shown in the drawings, as specifically shown by some examples, and it is possible to make various modifications or applications without departing from the technical idea of the disclosure.

In the above embodiment, the opening 77 serves as a jetting port for jetting the machining liquid when forming the first liquid current, and as a suction port for sucking the machining liquid when forming the second liquid current. Instead of the above, one opening 77 serving as the jetting port and the other opening 77 serving as the suction port may be provided separately. The opening 77 may be formed in places other than the lower surface of the guide base 45 as long as the opening 77 is near the machined hole H during the machining operation.

Further, the liquid current generator 7 is not limited to the configuration specifically shown in the embodiment as long as the liquid current generator 7 can selectively form the first liquid current and the second liquid current. For example, although the first channel 50 and the second channel 60 are disposed in parallel between the pump 71 and the pipeline 75, the first channel 50 and the second channel 60 may be disposed independently of each other. In addition, although the pump 71 is provided for both the first channel 50 and the second channel 60 in the present embodiment, separate pumps may be provided respectively for the first channel 50 and the second channel 60. Furthermore, although the machining liquid is sucked using the aspirator 65 for forming the second liquid current in the present embodiment, other means such as a vacuum pump may be used.

In addition, the states of the machining liquid environment and the suction environment may be judged by a method other than the above-described method. For example, the controller 9 first performs the machining operation for a predetermined time respectively in the state of forming the first liquid current or the second liquid current. Next, the controller 9 compares the machining state at the time of forming the first liquid current with the machining state at the time of forming the second liquid current. Then, the controller 9 controls the liquid current generator 7 to form one of the first liquid current and the second liquid current, which achieves a better machining state.

What is claimed is:

1. A fine hole electric discharge machine, generating an electric discharge in a machining gap formed between a tool electrode and a workpiece to machine a hole in the workpiece, the fine hole electric discharge machine comprising:
    a machining tank accommodating the workpiece;
    a storage tank storing machining liquid;
    at least one pipeline which has at least one opening directed to an upper surface of the workpiece and through which the machining liquid flows;
    a guide base comprising a lower guide which positions and guides the tool electrode, wherein the at least one opening is formed on a lower surface of the guide base;
    a liquid current generator selectively forming a first liquid current or a second liquid current, wherein the first liquid current is the machining liquid which is supplied from the storage tank and jetted from a predetermined opening of the at least one opening directed to the upper surface of the workpiece, and the second liquid current is the machining liquid which is sucked from an opening the same as or different from the predetermined opening of the at least one opening directed to the upper surface of the workpiece and recovered to the storage tank; and
    a controller controlling the liquid current generator to selectively form the first liquid current or the second liquid current according to a machining liquid environment, a suction environment, or an operation purpose,
    wherein the machining liquid environment contains a state where the machining gap is submerged in the machining liquid and a state where the machining gap is not submerged in the machining liquid,
    wherein the suction environment contains a state where the opening the same as or different from the predetermined opening of the at least one opening for sucking the machining liquid is sufficiently close to the machining gap and a state where the opening the same as or different from the predetermined opening of the at least one opening for sucking the machining liquid is not sufficiently close to the machining gap, and wherein the operation purpose indicates which of a machining operation and a contact detection operation is a purpose of the fine hole electric discharge machine.

2. The fine hole electric discharge machine according to claim 1, wherein the at least one opening is formed to surround the tool electrode.

3. The fine hole electric discharge machine according to claim 1, wherein the at least one pipeline is formed inside the guide base.

4. The fine hole electric discharge machine according to claim 1, further comprising a power supply which applies a voltage to the machining gap to repeatedly generate the electric discharge for removing a material of the workpiece.

5. The fine hole electric discharge machine according to claim 1, further comprising a contact detector which detects a contact between the tool electrode and the workpiece.

6. The fine hole electric discharge machine according to claim 5, wherein the controller controls the liquid current generator to form the first liquid current in preparation for an operation of the contact detector during non-machining.

7. The fine hole electric discharge machine according to claim 1, further comprising a liquid level sensor which detects a liquid level of the machining liquid supplied to the machining tank, wherein the controller controls the liquid current generator to form the first liquid current when the liquid level is lower than a predetermined height and to form the second liquid current when the liquid level is at the predetermined height or higher during machining.

8. The fine hole electric discharge machine according to claim 1, further comprising a jetting pressure sensor which measures a pressure of the first liquid current, wherein the controller controls the liquid current generator to form the first liquid current in advance for a predetermined time to measure the pressure, and then controls the liquid current generator to form the first liquid current during machining when the pressure is less than a predetermined threshold value and to form the second liquid current when the pressure is equal to or greater than the predetermined threshold value during machining.

9. The fine hole electric discharge machine according to claim 1, further comprising a liquid level sensor which detects a liquid level of the machining liquid supplied to the machining tank, and a jetting pressure sensor which measures a pressure of the first liquid current, wherein the controller controls the liquid current generator to form the first liquid current in advance for a predetermined time to measure the pressure, and then controls the liquid current generator to form the first liquid current during machining when the liquid level is lower than a predetermined height or when the liquid level is at the predetermined height or higher and the pressure is less than a predetermined threshold value, and to form the second liquid current when the liquid level is at the predetermined height or higher and the pressure is equal to or greater than the predetermined threshold value during machining.

10. The fine hole electric discharge machine according to claim 1, further comprising a machining state detector which detects a machining state, wherein the controller compares the machining state at the time of machining while forming the first liquid current with the machining state at the time of machining while forming the second liquid current, and controls the liquid current generator to form one of the first liquid current and the second liquid current, which achieves a better machining state, during machining.

11. The fine hole electric discharge machine according to claim 10, wherein the machining state comprises at least one of an electric discharge frequency, an electric discharge voltage, and a machining speed.

12. The fine hole electric discharge machine according to claim 1, wherein the liquid current generator comprises:

at least one pump supplying the machining liquid from the storage tank;

a first channel including a first solenoid valve connected between a predetermined pump of the at least one pump and the at least one pipeline;

a second channel disposed in parallel with the first channel between the predetermined pump and the at least one pipeline, or disposed independently from the first channel between a different pump from the predetermined pump of the at least one pump, wherein the second channel includes an aspirator connected between the predetermined pump or the different pump and the at least one pipeline and having a supply port, a suction port, a discharge port connected to the storage tank, a second solenoid valve connected between the predetermined pump or the different pump and the supply port, and a third solenoid valve connected between the suction port and the at least one pipeline, wherein the controller:

supplies the machining liquid from the predetermined pump to form the first liquid current in a state of opening the first solenoid valve, and supplies the machining liquid from the predetermined pump or the different pump to form the second liquid current in a state of opening the second solenoid valve and the third solenoid valve.

13. The fine hole electric discharge machine according to claim 12, wherein the second channel disposed in parallel with the first channel between the predetermined pump and the at least one pipeline, the aspirator connected between the predetermined pump and the at least one pipeline, the second solenoid valve connected between the predetermined pump and the supply port, and the controller supplies the machining liquid from the predetermined pump to form the first liquid current in a state of opening the first solenoid valve, and supplies the machining liquid from the predetermined pump to form the second liquid current in a state of opening the second solenoid valve and the third solenoid valve.

* * * * *